United States Patent [19]

Klein

[11] 3,855,049

[45] Dec. 17, 1974

[54] COMPOSITE POLYMER PRODUCTS FOR THAT

[75] Inventor: Max Klein, New Shrewsbury, N.J.

[73] Assignee: Normac, Inc., Matawan, N.J.

[22] Filed: Mar. 2, 1971

[21] Appl. No.: 120,346

[52] U.S. Cl. ............ 161/160, 161/162, 260/2.5 AK, 260/2.5 BE, 264/46, 264/DIG. 7
[51] Int. Cl. ..................... C08g 41/04, B32b 5/20
[58] Field of Search .............. 260/2.5 AK, 2.5 BE; 264/DIG. 7, 46; 161/162, 168, 160

[56] References Cited
UNITED STATES PATENTS

| | | | |
|---|---|---|---|
| 2,958,905 | 11/1960 | Newberg et al. | 264/DIG. 7 |
| 3,173,826 | 3/1965 | Campbell et al. | 161/161 |
| 3,256,218 | 6/1966 | Knox | 260/2.5 AK |
| 3,471,356 | 10/1969 | Kolb et al. | 161/161 |
| 3,607,797 | 9/1971 | Rubens | 260/2.5 AK |
| 3,646,180 | 2/1972 | Winnick | 264/45 |
| 3,662,043 | 5/1972 | Rubens | 161/159 |
| 3,697,366 | 10/1972 | Harlock et al. | 161/159 |

*Primary Examiner*—William J. Van Balen

[57] ABSTRACT

The disclosure concerns a rigid, light weight structural composite comprising relatively fully expanded styrene-polymer bit-pieces adhesively enmeshed in a thermoset foam polyurethane matrix.

8 Claims, No Drawings

COMPOSITE POLYMER PRODUCTS FOR THAT

This invention is that of rigid, light weight structural and decorative composite polymer solid products, such as prismatic products as blocks and panels, composed of discrete relatively fully expanded polystyrene bit-pieces (such as pellets, spheres, and grind) enmeshed in a two component low density polyurethane matrix. These products manifest enhanced strength and resistance to breakage and deformation, and lighter weight over that of corresponding such solid products of merely expanded polystyrene or of thermoset polyurethane.

A particular aspect of the invention is the preparation of these rigid light weight composite solid or block or panel products composed of the discrete expanded polystyrene bit-pieces enmeshed in the polyurethane matrix. A novel mold composed of separable members serves as an effective adjunct in preparing these products and is particularly beneficial in the preparation and release of these solid composite polymer block or panel products of the invention and especially of decorative such panels.

Molded blocks or panels of discrete bit-pieces of expanded polystyrene of original expanded bulk-density of a pound or less per cubic foot manifest very poor structural properties, are very prone to deformation, and have low resistance to breakage. That results from its little or substantially no significant surface stength, because of which it appears like a resilient, spongy material with very poor tear resistance or tensile strength. Polyurethane blocks of panels, for example, produced with a two pound per cubic foot density, are very weak, easily deformed and collapsible material with poor surface strength.

On the other hand, the solid products such as the composite polymer blocks or panels provided by the invention have properties distinctly different from and superior to those exhibited by blocks or panels of either molded discrete bit-pieces of expanded polystyrene alone or set polyurethane resins alone.

Attempts have been made to produce composite polymer block or panel products by pairing the admixed two component polyurethane-forming liquid over the discrete bit-pieces of expanded polystyrene in a forminig mold. However, that procedure was unsatisfactory because it did not adequately wet the expanded polystyrene by the polyurethane-forming liquid, and resulted in non-uniform distribution of the polystyrene pieces in the liquid. Consequently, the resulting finished molded composite polymer blocks or panels had many areas of concentrated expanded polystyrene pieces in their exposed surfaces and along the edges of the panel, with accompanying poor adhesion and weak surfaces readily prone to deformation and even loosening and loss of expanded polystyrene material.

The endeavor to avoid those shortcomings by charging the expanded polystyrene bit-pieces, such as expanded spheres, into the polyurethane foam-forming liquid mixture while stirring was not free from similar disadvantages. That is so because by that alternate procedure incomplete wetting of the expanded polystyrene pieces also occurred with similarly resulting poor adhesion. Then too, during addition of the expanded polystyrene pieces while agitating the polyurethane-forming liquid, increasing viscosity of the liquid developed with the starting and continuing of the polymerization which provided the foamed polyurethane polymer. These conditions also provided final composite polymer blocks and panels with poor adhesion, an undesirable extent of tendency to surface deformation, and spotting clusters or concentrations of expanded polystyrene pieces about the exposed surfaces and along their edges.

The foregoing difficulties, disadvantages and shortcomings of the earlier methods and their resulting products are overcome by the method of the invention and the products resulting from it.

The term "bit-pieces" includes any of the discrete free-flowing forms of any of the styrene-polymers, such as the various sizes of granules made by cutting the extruded polymer into small lengths and usually called pellets, the beads of various sizes obtained from suspension polymerization or otherwise as molding, the finely divided particles obtained by disintegrating any of these different forms, the so-called "grind" including the coarsely ground molded styrene-polymer or waste such molded polymer (of various sizes, e.g., ⅛ inch thickness, ¼ inch width, and ⅜ inch length), and any other small sized shapes of any of them.

Considered broadly, the method of the invention comprises admixing by weight from about 7 to about 12 parts of discrete expanded polystyrene bit-pieces in about one hundred parts of the pre-polymer liquid diisocyanate component (which serves in part in providing the polyurethane) for a sufficient time, generally less than about a minute and often as little as about 20 seconds, until substantially the entire charge of the expanded polystyrene pieces is fully wetted and coated over by the pre-polymer; admixing into this initial mixture of the expanded polystyrene bit-pieces in said pre-polymer about 100 parts of the polyol and catalyst containing component needed to provide the polyurethane, for a sufficient time (generally of less than about a minute and often as low as about a half minute) until said polyol and catalyst containing component is admixed uniformly with the mixture of the pre-polymer and the expanded polystyrene bit-pieces; charging the said later resulting mixture into a liquid-tightly closeable mold to the extent of from about one-quarter to about two-thirds of its volume, or more when a still denser end product is sought, and in such case even to about its entire volume; liquid tightly-closing the mold, and allowing the polymerization and the foaming of the polyurethane to continue in the mold exposed to the ambient temperature for a time sufficient, generally about 15 minutes or so, for the resulting foamed polyurethane with the expanded polystyrene pieces enmeshed in it to set to a final rigid solid mass such as a block or panel product. Thereafter, the mold is opened and the finished product released from it.

The products of the invention, broadly considered, are rigid, light weight structural or decorative composite polymer solid masses, such as prismatic products as blocks and panels, or other shaped as even ellipsoid or spherical, composed of discrete relatively fully expanded polystyrene bit-pieces adhesively enmeshed in a thermoset low or other density polyurethane matrix, and manifesting enhanced tensile and compressive strength and low frangibility.

These solid mass products of the invention, such as the prismatic solids as blocks or panels are useful in building up partitions or wall panels, and when made large enough can serve as complete panels. They also are useful as insulation against cold or heat as in building walls or refrigerators and particularly of the walk-in size.

A modification of a method of the invention includes the step of laying a decorative sheet (impervious to the combined liquid components that provide the polyurethane) face downward on the inner surface of the base of the mold before charging into it the resulting final mixture provided by admixing the mixture of the prepolymer and the expanded polystyrene bit-pieces with the polyol and catalyst containing component for providing the polyurethane.

This embodiment including that intermediate step enables preparing the decorative composite polymer solid mass products of the invention such as the substantially prismatic masses as blocks or panels, and particularly those which provide permanently mounted graphic art products, such as photographs, pictures and prints, whether in black and white or in various combinations of colors.

Thus, the decorative composite polymer solid products of the invention, broadly speaking, are variously shaped composite polymer solid masses, including the substantially prismatic masses as composite polymer blocks and panels, composed of discrete relatively fully expanded polystyrene or other styrene-polymer bit-pieces adhesively enmeshed in an expanded polyurethane matrix, which blocks have on at least one face thereof a sheet material impervious to liquid constituents used in providing the polyurethane and held by the latter permanently bonded to said block face, and with the exposed face of said sheet material bearing certain decorative material or being capable of having decorative material applied to it by compositions which if they can penetrate the sheet material are inert to the set polyurethane.

The separable mold of the invention effective, for example, in making the substantially prismatic or other parallel-faced products of the invention comprises a substantially rigid base plate (inert to the liquid substances used in providing the polyurethane) and a like cover plate, a similarly inert separable boundary or frame member composed of at least two slats, means fixedly applicable to said slats to enable them to be removably yet rigidly fixedly held together to provide the liquid-tight enclosing frame, and being of such form to enable it to be liquid-tightly sandwiched between opposed faces of the cover plate and bottom plate to provide a liquid-tightly closed mold cavity, means applicable to the enclosing frame and each of the mold bottom plate and cover plate to enable removable yet rigidly fixedly holding said enclosing frame liquid-tightly sandwiched between opposing faces of the mold base plate and cover plate.

The method of the invention, the separable mold used in it, the composite molding modification of the method used in permanent mounting of preferably nonporous (to the combined foam-providing, polyurethane-forming liquid mixture) decorative sheet material, and the resulting composite molded products, are illustrated, but not to be limited, by the following examples:

Example 1 — The Panel-Forming Mold: The one-quarter inch thick aluminum plates are cut to 22 inches length by 18 inches width each. Along a line parallel to and ½ inch in from each of the long sides of each plate there is drilled through each plate a bore of 11/32 diameter with its center on that half inch in line at a point 2 inches in from each of the ends (i.e., from the plate width).

Along each of those ½ inch in lines and between each pair of these first two bores there are drilled five more 11/32 inch diameter bores with their centers spaced 3 inches apart from one another and the first two bores on that line, thus providing parallel to each side seven such bores along that one-half inch in line, with the first and last of these bores being spaced 2 inches in from its respective end of the plate and the other five at equal intervals of 3 inches each.

Similarly, with their centers along a line parallel to and spaced ½ inch in from each of the ends and at a point 1.5 inches in from each of the sides, there is drilled through each of these plates four such 11/32 inch diameter bores. Then, along each of these ½ inch in from the end lines and in between these first two bores on each of them, there are drilled at consecutive three inch intervals four more such bores along those two lines in from the ends of each plate.

One of these two identical aluminum plates with a total of 26 such (so-called "stud-receiving") bores through its thickness serves as the mold base and the other such plate serves as the mold cover.

The enclosing mold boundary or frame which is to be set on the upper face of the mold bottom plate and to serve to support the mold cover, is composed of four aluminum slats, each being three-quarters of an inch high and 1 inch wide, with two of them being called the frame sides and 22 inches long, and the other two being called the frame ends and 18 inches long.

Through the thickness of each of the frame side slats and with their centers along a line midway along its width, there are drilled seven stud-receiving bores so spaced along the length of each side slat to be in register with the seven stud-receiving bores in the line parallel to the corresponding side of the mold base when one face of the side slat is in register with a side of the mold base and the ends of that slat are in register with the ends of the mold base.

At each of seven locations, one adjacent each stud-receiving bore, in what is the exposed or outer vertical surface or face of each frame side slat, and also at each of six locations, one for each stud-receiving bore in what is to be the exposed outer or vertical surface or face of each frame end slat, when all of the slats are postioned for use on the mold base, and at a level about midway of the height of their stud-receiving bores, there extends horizontally from the outer face of each slat for each stud-receiving bore, a quarter inch tapped bore with its axis normal to that of the adjacent stud-receiving bore, into and communicating with its corresponding stud-receiving bore. Each such tap is to receive a quarter inch outside diameter set screw with 20 threads per inch.

The vertical face of each frame slat, which has no set screw-receiving tapped bores, conveniently is called the inside or inner face of the respective frame slat.

A separate ¾ inch long assembling stud bolt of ¼ inch outer diameter and 20 threads per inch is tightly threaded for a distance of ⅜ inch into a ¼ inch diameter tapped bore extending horizontally centrally into each end of each frame and slat. An 11/32 inside diameter assembly bore is drilled horizontally through the 1 inch thickness of each end of each frame side slat and with its axis one-half inch inward of its end of the slat and at a level midway of the height of the slat.

The boundary or mold frame is assembled by positioning a frame side slat with its inner face toward and spaced away from the assembler. With one of the frame end slats held horizontally with its outer face perpendicular to this first frame side slat at its right hand end, the assembling bolt of that frame end slat nearer the first frame side slat is inserted through the latter's right hand assembly bore, and an assembly nut is threaded over the protruding end of that bolt to bring the respective adjacent ends nearly tightly together.

A second frame end slat is placed with its inner face facing the inner face of this first frame end slat and perpendicular to the left hand end of the first frame side slat. The assembling bolt of this second frame end slat similarly is inserted through the left hand assembling bore of the first frame side slat and an assembly nut similarly is threaded over the protruding end of this second bolt to bring the respective ends nearly tightly together.

The inner face of the second frame side slat then is faced toward the inner face of the first one of them, and each remaining assembling bolt of the two frame end slats is inserted into its respective assembly bore of the second side slat. The latter is brought nearly tightly together with the two frame end slats by similarly threading a separate assembly nut onto each of these two assembling bolts.

Into each stud-receiving bore in each of the two frame side slats, and also into each of those bores in both of the frame end slats, is inserted a quarter inch outside diameter stud bolt at least 1¼ inches long and threaded at 20 threads per inch. Each such stud bolt is inserted to an extent to allow about three-quarters of an inch of its length to protrude above and below its respective frame and is held fixed in that position by threading a set screw tightly against it through its respective adjacent set screw bore.

The mold base plate with whichever of its surfaces is to be the inner face or actual bottom of the mold cavity facing downward is placed over the mold frame in such position that the seven orifices or bores on each side of the base plate and six orifices adjacent each of its ends fit in register over the respective corresponding seven stud bolt ends extending above each of the two side slats and the six stud bolt ends extending above each of the two end slats of the mold frame. The four assembly nuts are then threaded further over their respective assembling studs sufficiently to draw the respective adjacent slat ends together liquid-tightly to close each frame corner.

Starting at the end of one of the stud bolts protruding beyond the outer face of the mold base, a separate quarter inch (inside diameter) nut is threaded over that protruding end of the stud bolt until the nut shoulder is pressed tightly against the adjoining area of the exposed face of the mold base with simultaneously so tightly pressing the corresponding portion of its inner face against the contiguous part of the mold frame to provide there substantially liquid-tight engagement between the latter and the mold base. The same operation is repeated with a separate such nut at each succeeding stud bolt of all of them until the frame and the mold base are in liquid-tight engagement. The mold then is ready to be turned over and held in horizontal position with its mold cavity facing upward ready for use.

Example 2 — Composite Molding Panels: Thirty grams of discrete expanded polystyrene spheres, individually relatively spherically-shaped and averaging about 5/16 inch in diameter, were charged into a 6 quart enameled-lined steel vessel. Three hundred grams of a so-called polyurethane pre-polymer, namely, a crude mixture having approximately 80% of 2,4-toluene diisocyanate and about 20% of 2,6-toluene diisocyanate, were added to the vessel; and the mixture agitated for much less than a minute and actually about 20 seconds or so, until the entire amount of polystyrene spheres was fully wetted and coated by the prepolymer.

Then there was charged into that first mixture 300 grams of the so-called polyol and catalyst component for the polyurethane; and this second mixture was vigorously agitated for about 30 seconds until the polyol-catalyst component was admixed uniformly with the mixture of the pre-polymer and the polystyrene spheres. The polyol-catalyst component contained 100 parts of an alpha-methylglucoside having hydroxyl number of 460, functionality 4 (i.e., having 4 active hydroxyls), and viscosity of about 100,000 centipoises at 25°c., 8 parts of N,N,N',N'-tetrakis(2-hydroxypropyl) ethylenediamine, 0.3 part of triethylenediamine, and 0.02 part of dibutyl tin dilaurate (as catalysts), 0.5 part of N,N-dimethylethanolamine, 38 parts of trichlorofluormethane (as blowing agent), and 1.5 parts of silicone surfactant.

The mixture of the expanded polystyrene spheres and both components for the polyurethane was poured into the mold cavity (measuring 16 inches by 20 inches by ¾ of an inch) of the mold of Example 1. The mold then was closed by so positioning the mold cover over the uupwardly extending free ends of the stud bolts in the mold frame that they passed through the corresponding orifices in the cover plate, and fastening the latter down liquid-tightly on the mold frame by turning a nut down tightly against the mold cover on each of the stud bolts in the same way as the mold base was removably but liquid-tightly engaged with the frame.

The thus sealed mold was allowed to remain at the room temperature until the polyurethane with admixed expanded polystyrene spheres was firmly set. This required about 15 minutes. The mold then was opened by removing the nuts from all of the stud bolts, lifting the cover plate and lowering the base plate from the mold frame, loosening the nuts from the assembling studs of the frame end slats, and then removing the loose frame assembly from the finished molded composite panel.

Example 3 — Decorative Composite Polymer Panels And Dry Mounting: To obtain a decorative composite polymer panel, the procedure of Example 2 is followed except that before the finished two-component liquid polyurethane-providing mixture with admixed expandable polystyrene spheres is poured into the mold, the mold cavity face of the base is covered with a sheet of the decorative material with its face side down. Beneficially, that sheet is slightly larger in both dimensions than the bottom area of the mold cavity so that the peripheral overage can be tightly clamped between the portion of the under side of the mold frame and the inner face of the base plate interior of the part of the stud bolts adjacent the frame and that plate.

However, particularly for dry mounting of artistic and other photographic prints, whether colored or black and white, to assure obtaining a fully flat, smooth and entirely flush-mounted print, the mold cavity surface of the base plate is sanded smooth with a suitably fine sandpaper and wiped clean. The print then is placed face down on the thus cleaned mold cavity base with the peripheral overage of the print extending to the innermost peripheral part of the orifices in the base plate, and weighting the exposed surface of the print down with a panel weighing several pounds (at least sufficient to hold the entire print wholly flat until its peripheral overage is tightly engaged between the base plate and the mold frame) about a half inch to an inch shorter in length and width than the inner dimensions of the frame, to assure fully flat, uniform contact of the face of the print with the aluminum mold base.

The mold frame is assembled as in Example 1 and is lowered onto the peripheral overage of the print with the depending free ends of the stud bolts passing through the orifices in the base plate. The frame and print are then fixedly rigidly held in place by drawing the nuts up tightly against the underside of the mold base to cause the peripheral portion of its inner face to engage the peripheral overage of the print between the base and the under surface of the mold frame. The weighting-down panel then is removed and the process followed as in Example 2.

The finished product of this Example 3 can be used as a finished picture or map or other item to be hung on the wall of a room. For such use, it is beneficial then before covering the mold, either before or after charging the complete composite liquid mixture into it, to place over what is to be the inner surface of the cover plate a sheet material of the type usually, or desired to be, used as a backing for decorative items for that use, such as kraft paper or other suitable type (preferably impervious to the liquid content of that mixture) and of such size as to cover what is to be the back of the finished block.

Any of the decorative composite polymer panels of Example 3 can be prepared in its single molding operation in a form having all of its end surfaces (i.e., other than the large front and back surfaces) finished with any desired suitable decorative framing materials (broadly called "decorative end-finishing materials") such as formica of any desired design, wood, aluminum or other decorative metal, inert plastics, and others, thereby to provide a finished product that avoids the need and expense of additional framing.

That is done by cutting strips of such decorative end-finishing materials of the respective same sizes as the inner (assembled) surfaces of the four mold frame slats, beveling the narrow ends of each strip at a 45° angle (running inward from the decorative surface) to enable each pair (i.e., one in each mold cavity corner) of contacting beveled surfaces to meet in a tight fit on placing a set of four of these strips against the respective surfaces of the four mold frame slats, thereby to provide liquid-tight contact at each corner.

Then on charging the complete composite polyurethane-providing liquid mixture into the mold and completing the process as in Example 2 or 3, the final product removed from the mold is ready for mounting on a wall (after attachment of requisite hanging means) and needs no framing because of its securely attached and decorative framing strips.

Example 4 — Mirror-Faced Composite Polymer Panels: The decorative sheet material used in Example 3 was replaced by a sheet of mirror glass of the same dimensions as those of the planar area enclosed by the mold boundary frame when its corners are liquid-tightly brought together. Thus, on placing such sheet of mirror glass with its front (or viewing) surface contacting the base of the mold cavity, liquid-tightly closing the mold about it, and then conducting the molding process as in Example 2, there is provided a composite molded panel having a firmly adhering mirror face with significantly reduced frangibility on dropping and manifesting desirable shatter-proof quality and restraint against scattering.

Example 6 — Tile-Faced Composite Polymer Panels: The mirror glass of Example 4 was replaced by a dozen tiles, 3 columns of 4 tiles (4 inches square) each with their faces down in a mold cavity having a base measuring 12 inches by 16 inches, and the process of Example 2 was otherwise repeated using about 60% of its quantity of the complete composite liquid polyurethane-providing mixture (with its admixed polystyrene bit-pieces). There was provided a composite molded panel having a face of firmly adhering tiles on it.

The covered panel product of each of Examples 4 and 5 respectively can be prepared in a single molding operation in a form having all of its end surfaces finished with any decorative end-finishing material of the type, and by the modification of Example 3, described on page 13 (its first 2 complete paragraphs) hereof.

The molding conditions during the approximately 15 minutes residence of the charge in the sealed mold indicate that the molding is conducted beneficially at from a minimum temperature of about 70°C. to a maximum of about 110°F. That range of molding duration temperature is readily obtainable by the ordinary ambient temperature in the plant (taking into account the heating of the plant in the winter), and the mold needs no external heating during the molding period because of the heat developed by the exothermic reaction of the polmerization that provides the polyurethane.

The temperature of each of the two separate components for providing the polyurethane (i.e., the prepolymer and the polyol-catalyst components) preliminary to using them can be at least above 40°F. and beneficially should be below about 80°F.

In each of Examples 2 and 3, the mold was about half filled when the complete composite liquid mixture used in them was charged into the mold. It is indicated earlier above that the portion of the volume of the mold cavity occupied by the charge may differ from that.

Instead of using simply polystyrene as the expanded styrene-polymer, any other expanded styrene polymer can be used. Thus, the term "styrene-polymer" embraces not only polystyrene itself but also polymers of any polymerizable substituted styrenes in any of their available average molecular weights, as well as copolymers of styrene with one or more other compatible polymerizable substances as the nuclear-alkylated or -halogenated styrenes, such as the ring-methyl- or -chlorine-substituted styrenes, or even alpha-methyl styrene, or copolymers of any of these with nitriles of acrylic acid and their alpha-position-alkylated homologs, vinyl esters of aliphatic and aromatic carboxylic acids, N-vinyl compounds as N-vinylcarbazole, N-vinylimidazole or N-vinylpyrrolidone.

Such copolymers of styrene usually shoud contain at least about 50% of styrene by weight, or it may be the predominating component or at least equal in predominance to the other higher present part of any terpolymers. The copolymers of styrene include also any of the various impact polystyrenes containing a major part of styrene and a minor part of a styrene-butadiene rubber (usually designated SBR, sometimes called Buna-S), for example, as produced by emulsion polymerization of about 75 parts of butadiene and about 25 parts of styrene.

Thus, styrene-polymers also include styrene alloys (i.e., pressure or melt mixtures) of polystyrene with other polymers. Included in styrene-polymers also are the ABS resins, for example, as prepared by using (by weight) acrylonitrile in the range of from about 20 to 30%, butadiene rubber ingredient at from about 10 to 15%, with the balance being styrene to provide a total of 100%. The ABS resin can be of the graft type G (that is with the mixture of the respective amounts of the monomers and butadiene being copolymerized) or of the alloy type B (i.e., for which the separately, for example, emulsion polymerized monomers in the selected proportions are physically mixed together at high temperature as in a Banbury-type mixer), and in either case extruded and pelletized.

The upper limit of about 12 parts of discrete expanded styrene-polymer bit-pieces to be admixed in about 100 parts of the free-polymer liquid diisocyanate component to be followed by their mixture then being mixed with about 100 parts of the polyol and catalyst containing component is particularly applicable to the decorative composite polymer molded products such as of Examples 3 to 5 as for pictures and the like and decorative wall panels.

However, for such panels and other molded products for use in insulation type applications, the maximum number of parts of the expanded styrene-polymer bit-pieces can even be as high as about 16 parts per 100 parts of each of the two polyurethane-providing components, but their complete composite liquid mixture still must be prepared as in the foregoing broad description of the method of the invention. Depending on what variations in properties may be desired in the insulating panels for their different applications, the volume of the mold occupied by the charge may be increased, for example, for corresponding change in density of the end product panels.

The two different polyurethane-providing components are not limited to those used in Example 2, for any other such respective polyurethane-providing components suitable for providing foamed polyurethane can be used so long as the pre-polymer first is mixed with the expanded styrene-polymer bit-pieces and their mixture is admixed with the polyol and catalyst component, and the resulting complete mixture is chemically inert to the particular expanded styrene-polymer bit-pieces constituent.

It has been found that when a product such as that of Example 3 is sought to be made by using a mixture of polystyrene bit-pieces admixed into an initial mixture of both the pre-polymer and the polyol-catalyst-containing component for preparing polyurethane, the adhering decorative coating sheet can be stripped from the resulting mold panel. That cannot be done with the adhering decorative coating sheet of the decorative composite molded panel product of Example 3.

The strength of the adherence provided by use of the method of this invention is shown, for example, by the results of a test on the product of Example 5. A product of Example 5 was immersed halfway vertically in a water barrel and exposed to the outdoor elements from last summer through this winter in New Jersey (exposed thus from the highest heat of the summer to the winter frost). On current inspection, neither the exposed nor the water-immersed tiles showed any evidence of any separation from the supporting solid panel of the polystyrene bit-pieces enmeshed in the polyurethane matrix (as prepared according to this invention).

The mold need not be confined to the specific dimensions used in the specific Examples 1 to 4. The mold can vary not only in size but also in proportions, depending on what is intended as the end use of the product of the molding operation. The mold also need not be merely rectangular prismatic but may have any other shape and dimensions, and so also as to its component parts, depending on the size and shape of the particular composite polymer product to be prepared.

Thus, the mold may be spherical and consist of two hemispherical parts, with or without an intermediate frame or belt portion (as around its equatorial portion); and each separate portion can have annularly outwardly extending flanges wherein orifices or bores can be drilled to enable stud bolts to be passed through adjacent such orifices in contiguous parts so as to enable drawing and holding them tightly together by the application of assembly nuts on the stud bolts.

The mold-forming metal need not be restricted merely to aluminum, for any other suitable mold-forming metal or alloy compatible with the constitution of the complete composite polyurethane-providing liquid mixture may be used as when aluminum is not suitable. However, due to the general suitability of aluminum by its light weight, good machinability, practical cost, and high heat conductivity, it may be more generally found suitable.

While the invention has been explained by detailed description of certain specific embodiments of its different aspects, it is understood that various substitutions and modifications may be made in any of these specific embodiments within the scope of the appended claims which are intended also to cover equivalents of the described embodiments.

What is claimed is:

1. A rigid, light weight structural composite polymer, overall stably adherent unitary solid block which comprises discrete, relatively fully expanded styrene-polymer bit-pieces adhesively enmeshed in a thermoset foam polyurethane matrix, wherein said styrene-polymer bit-pieces are by weight from about 3.38 to about 7.73 percent of the sum of said bit-pieces and the starting polyurethane-providing components.

2. A composite polymer, solid block as claimed in claim 1, having unitarily adhering to one face thereof a continuous layer of a decorative covering material or of a material adapted to receive a decorative covering, which layer is resistant to stripping off and impervious to any liquid constituent from which the polyurethane matrix resulted.

3. A composite polymer, solid block as claimed in claim 2, wherein said adhering layer of covering material is a permanently affixed sheet of a photographic arts print surpassing dry mounting.

4. A composite polymer solid block as claimed in claim 2, wherein said adhering layer of covering material comprises a permanently affixed vitreous substance.

5. A composite polymer solid block as claimed in claim 4, wherein said adhering covering material layer is a mirror glass with its untreated glass face exposed and manifesting desirable shatter-proof quality and restraint against scattering.

6. A composite polymer solid block as claimed in claim 4, wherein said adhering covering material layer is a plurality of permanently affixed adjacent columns and rows of ceramic tiles with their glazed surfaces exposed.

7. A composite polymer, solid block as claimed in claim 2, wherein the solid block is a prismatic panel with an adherent covering layer on one of its faces and is a decorative covering material, and the peripheral sides of said panel are covered with a unitarily adhering decorative end-finishing material and require no framing.

8. A composite polymer, solid block as claimed in claim 7, wherein said adhering decorative end-finishing material is a rigid strip selected from formica, aluminum, or other strip-form decorative metal.

* * * * *